United States Patent

[11] 3,545,749

[72] Inventor Edgar Schmued
 5051 Palos Verdes Drive N., Rolling Hills
 Estates, California 90274
[21] Appl. No. 721,652
[22] Filed April 16, 1968
[45] Patented Dec. 8, 1970

[54] REACTION MEASURING METHOD
 4 Claims, 6 Drawing Figs.
[52] U.S. Cl. .................................................. 273/1,
 35/22
[51] Int. Cl. ...................................................... A61b 5/18
[50] Field of Search ............................................ 273/1;
 35/22; 33/(Inquired)

[56] References Cited
 UNITED STATES PATENTS
 2,834,597 5/1958 Ylinen ........................ 273/1X 2,995,371 8/1961 Nelson ......................... 273/1
 OTHER REFERENCES
 Archery Magazine Feb. 1970 pgs. 20— 22 " Scientific
Study of Archery" reprinted from November 1962.

Primary Examiner— Anton O. Oechsle
Assistant Examiner— Paul E. Shapiro
Attorney— Willard M. Graham ABSTRACT: A method wherein a portable scalelike instrument is suspended against a vertical surface by manual pressure applied thereto by a first person and suddenly released to fall freely down said surface and subsequently arrested by a second person and compressed against the vertical surface to measure the reacting time of the second person as indicated by the distance the instrument falls from the time of release by the first person to the time the second person is able to arrest and compress the instrument against the vertical surface.

PATENTED DEC 8 1970
3,545,749
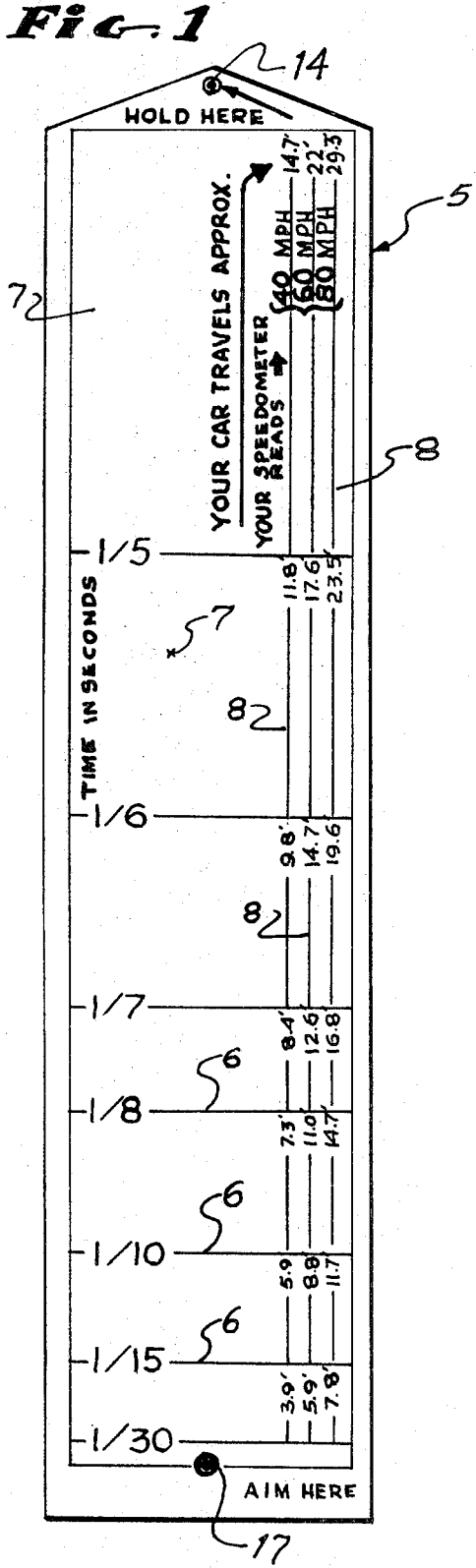
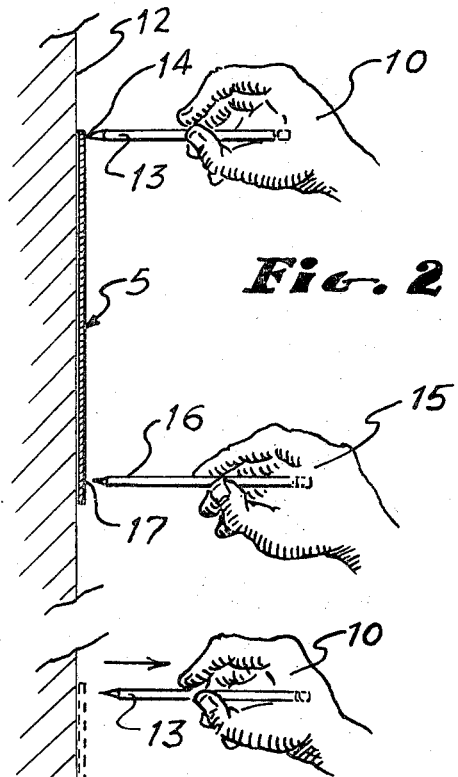
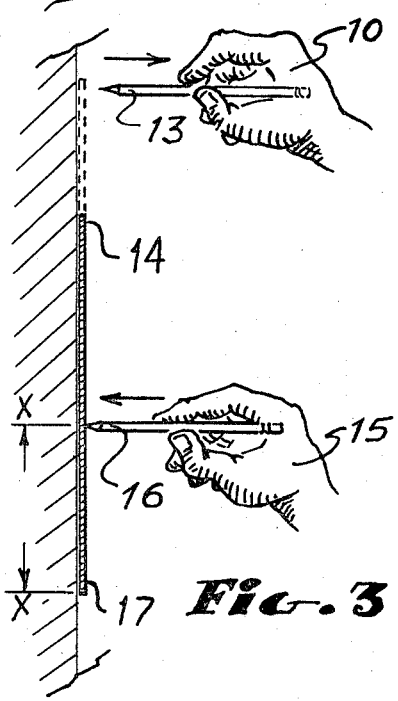
EDGAR SCHMUED
INVENTOR

EDGAR SCHMUED
INVENTOR

REACTION MEASURING METHOD

BACKGROUND OF THE INVENTION

Machines have been designed for clinical diagnosis and currently are in use primarily for measuring precisely the reacting time of a human subject. These machines measure the exact elapsed time between the reception by the subject of a visual signal or optically received stimulus and his subsequent muscular or physical action such as the motion of his hand in response thereto. However, in addition to being expensive, these machines are restricted in their application and are much too large and bulky for portable use. Moreover, these machines do not correlate the reacting time of the subject with any measurable parameter such as distance.

Currently, there is an urgent need for a simple, inexpensive, but reasonably accurate portable recording instrument for measuring the effective reacting time of a human subject against a second measurable parameter such as distance or velocity.

One highly important test in which such an instrument will be singularly useful, to state departments of motor vehicles and highway patrols for example, is in testing and measuring the reacting time of motorists to obtain an estimate of a motorist's ability to apply the brakes of his automobile upon reception of a visual event such as the sudden appearance of another vehicle, or pedestrian, in time to avoid a collision therewith. In any such situation, it is obvious that the reacting time of a human subject is a function of time and distance. The time which lapses between the instant the subject receives the visual signal or stimulus and the time it requires the subject to muscularly or physically respond to the visual signal can be referred to has his effective reacting time. Applied to a motorist operating a vehicle at a given speed, his reacting time can be correlated and measured against the distance traveled by the vehicle from his visual reception time to his physical act in response thereto. Such an instrument is invaluable in driver education and training programs to demonstrate the performance of human subjects under abnormal physical conditions such as mental or physical stress, under the influence of drugs or alcohol, or even excessive tobacco, all of which have a marked effect on their reacting time.

Such an instrument can also be useful for measuring eye-hand coordination, for example in testing applicants for employment in certain occupations wherein quick reflexes are of special importance.

Such an instrument also can be very useful as an amusement game or contest of skill in which two or more participants vie with one another by scoring points a based on reacting time.

There are numerous other time-distance related situations both in military as well as civilian life, all of which can be measured by the instrument referred to above, or employed as an exercise or training device by physiotherapists for example.

To this end, it is a primary object of my invention to provide a practical method for measuring the reacting time of a human subject.

It is a further object of my invention to provide a method for measuring the reacting time of a human subject relating to time-distance, at certain given speeds.

It is a still further object of my invention to provide a method and instrument for testing and demonstrating the eye-hand coordination of a human subject.

It is still another object of my present invention to provide a method for testing and demonstrating the reacting time of a human subject which is ideally suitable for a game of skill between two or more participants.

And it is a still further object of my invention to provide a method which is highly adaptable for use in physiotherapy.

SUMMARY OF THE INVENTION

In one preferred embodiment, the scale takes the form of a generally rectangular card divided along its length into markable areas or zones of different predetermined sizes and having printed thereon indicia representing distance traveled in free fall during certain fractions of one second of time, compared with the relative velocity of a motor vehicle.

In employing the method, the scale is suspended against a wall by a first person while a second person, whose reacting time is to be measured, aims a pencil at a point designated adjacent the bottom of the scale. Without warning, the first person releases the scale which falls freely down the wall whereupon the instant the second person observes the first person's hand movement to release the scale, the second person arrests the falling scale by pinning it against the wall, simultaneously placing a pencil mark in one of the areas, from which area an accurate measurement of the second person's reacting time is derived.

My invention will be more readily understood by reference to the ensuing detailed specification and appended drawings in which:

FIG. 1 is a front elevational view showing a preferred form of the instrument of my present invention.

FIG. 2 is a diagrammatic side elevational view illustrating the method of using the instrument of FIG. 1.

FIG. 3 is a diagrammatic side elevational view illustrating the action employed in the method of using the instrument of FIGS. 1 and 2.

DETAILED DESCRIPTION

Figure 4:
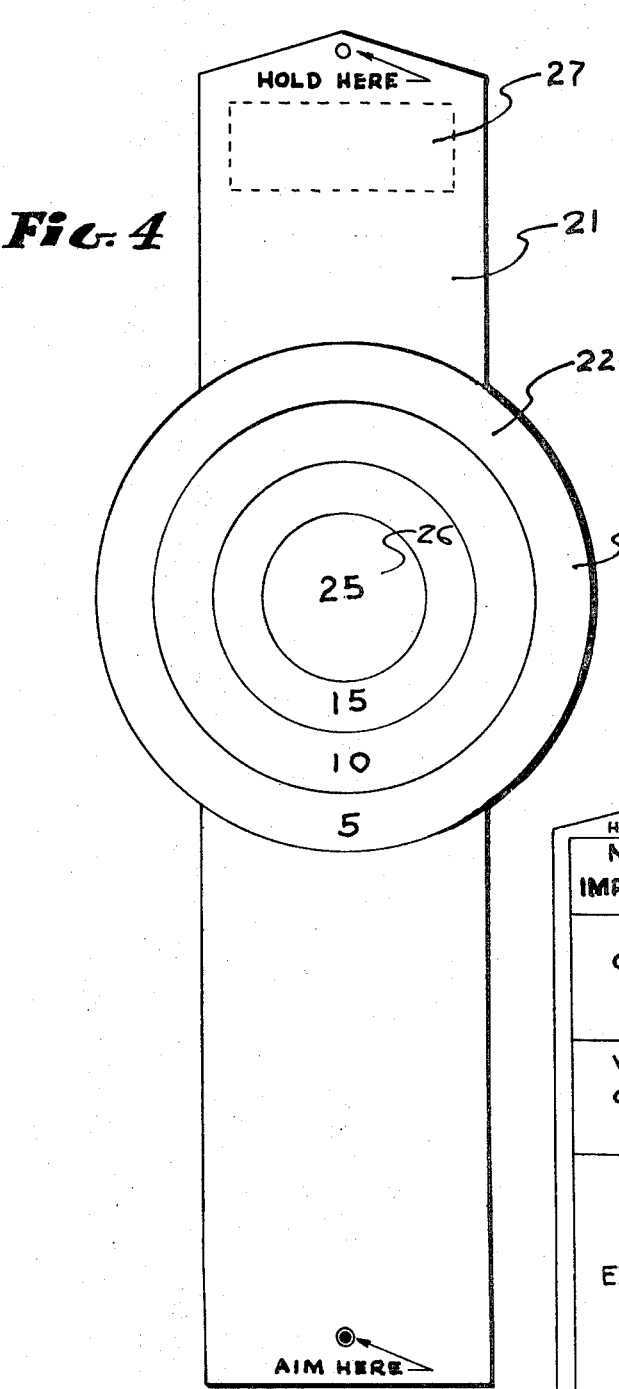
FIG. 4 is an alternate form of the means shown in FIGS. 1, 2, and 3.

The invention, as shown in FIG. 1, preferably takes the form of an elongated rectangular scalelike device 5 fabricated of sheet material such as bristol board, cardboard, plastic, or other fairly rigid material.

On the obverse side of the scale a series of transverse marks or lines 6 are engraved or printed dividing the length of the scale into spaces or zones 7 of different sizes representing elapsed time in fractions of one second of time correlated with the distance traveled by a body in free fall. However, it is the distance between the transverse marks 6, and not the area of the zone 7, that defines the value in fractions of time.

While it is generally known that bodies which fall in air are not freely falling bodies in the true sense of the term, for practical purposes in the present case, we can consider the motion of the above scale to be independent of the effect of air friction and the acceleration thereof due to gravity will be constant.

In calculating the distances between transverse marks 6, those skilled in mathematics may employ Newton's law of motion expressed in the equation:

$$T = \frac{\sqrt{2 \times S}}{G}$$

where:
T is seconds of time
S is distance, and
G is gravity

However, it will be easier for the general public to arithmetically compute the distances between the marks according to value of G, i.e., 32 feet-per-second, per second, or 980 centimeters-per-second, per second.

Thus, to obtain the distance traveled by the scale 5 in free fall, one divides distance by time, in fractions of one second of time, for example.

For purposes of illustration, I have divided the scale 5 of FIG. 1 into areas 7 representing the real distance traveled thereby in free fall for one-thirtieth second, one-fifteenth second, one-tenth second, etc., as shown, in inches. However, it is to be understood that such fractions of time are not arbitrary, and can be established for any desired division or fractions of time. Moreover, it will be obvious that the distances can be computed on the basis of the metric system as readily as on the English system of linear measurements.

Running lengthwise of the scale 5 and parallel with the axis thereof, I provide several lines 8 representing the relative distance in feet and decimals thereof that a vehicle moving at 40 m.p.h., 60 m.p.h., and 80 m.p.h., will travel during the distance the instrument will travel in free fall. Suitable indicia indicating these distances for each division or fraction of one second of time are printed along the lines generally as shown in FIG. 1.

I have found that the instrument calculated and arranged according to the foregoing description has found wide acceptance in departments of motor vehicles, traffic control agencies, highway patrol units, and driver education and training institutions.

The method of using the instrument of FIG. 1 is diagrammatically illustrated in FIGS. 2 and 3.

A first person 10 compresses the scale 5 against a vertical surface such as a wall 12 by pressing a pencil 13 or other suitable pointed instrument against the top of the scale 5 at point 14 indicated thereon, and maintains the scale in the position for a short period of time while the subject 15 being tested holds the point of a pencil 16 normally disposed to the aiming point 17 designated near the bottom of the scale 5, with the point of his pencil poised approximately one-eighth inch therefrom, and awaits the hand movement of the first person 10 to release the scale 5. At the precise moment the subject 15 observes the hand movement of the first person 10 releasing the scale, he moves his pencil 16 toward the aiming point 17, with a stabbing motion, to arrest as quickly as he can the falling scale 5 and presses it against the wall surface 12. The subject's pencil 16 arrests the falling scale and simultaneously places a pencil mark in one of the zones 7 defining the time-distance correlation indicating on the scale the distance that would be traveled by a vehicle at a given speed as indicated by the appropriate line 8.

The measured time of the subject's reaction as represented between lines X–X is then compared with a predetermined table (not shown) to determine whether or not the subject 15 would be capable of reacting physically to an emergency within predetermined limits of time established for safe driving, for example.

I have found, in experimenting with various persons under normal and abnormal physical conditions, that the reaction time of a normal person is from one-seventh to one-fifth of one second of time. Comparing the zones 7 defined between transverse lines of one-seventh of one second and one-fifth on the scale 5 of FIG. 1, we see that at 40 m.p.h., vehicle speed, the vehicle would travel from 9.8 feet to 11.8 feet during the lapsed time of the subject's reacting time; at 60 m.p.h. the vehicle would travel 14.7 feet to 17.6 feet, and at 80 m.p.h., from 19.6 feet to 1 23.5 feet.

I have further found that a subject's reacting time is slightly faster shortly after consuming a stimulant such as coffee. But a subject's reacting time is profoundly affected by a depressant such as alcohol or a drug such as benzedrine. In some instances it has been impossible for the subject, under the influence of a depressant, to hit the scale at all, i.e., the subject completely misses the scale in 5 or 6 tries.

In FIG. 4, another embodiment of the scale 21 having an alternate shape is shown in FIGS. 1, 2, and 3, the scale being designed for use as a game or contest of skill. On the obverse side of the scale 21 the printed artwork 22 takes the form of a target 23, with various numerals 24 representing scored points assigned to the concentric rings 25 defining the target zones. The center circle 26, commonly known as the bulls-eye, has point value of 25, for example. Here the skill tested is the ability of the contestant to hit the bulls-eye 26, or as near thereto as he is capable, in a preestablished number of attempts.

At the top of the scale 21, a table 27 representing several classifications of skill is printed. For example, the table may read as follows:

10 Attempts

50–40 points—Expert rifleman.
40–30 points—Sharpshooter.
30–20 points—Marksman.
20–10 points—Elephant hunter.
10–0 points—Novice.

Figure 5:
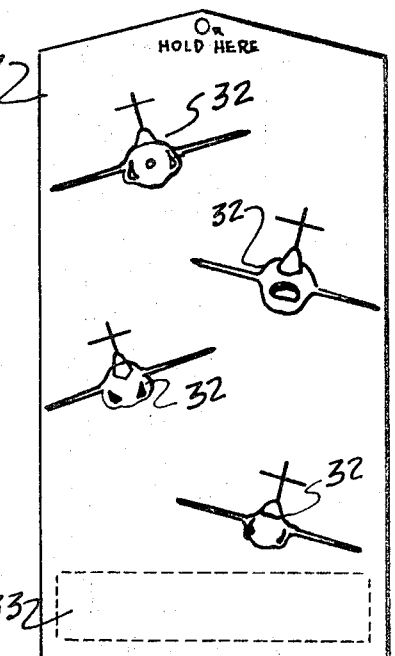
FIG. 5 is still another alternate form, for use as a contest of skill, similar to that shown in FIG. 4.

Many other variations of the game will occur to those skilled in the art, such as the scale 31 shown in FIG. 5 wherein several airplanes 32 are depicted. Here the object of the game is to place a pencil mark on one of the airplanes to score a kill. The table 33, in this game, can read as follows:

10 Sorties 5 kills—Ace of aces.
4 kills—Ace.
3 kills—Command pilot.
2 kills—Fighter pilot.

Figure 6:
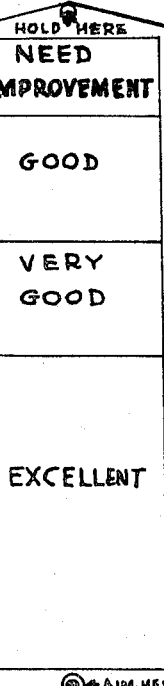
FIG. 6 is an embodiment of my invention adapted for use in physiotherapy.

In FIG. 6, a scale 41 is illustrated which will be singularly useful for use as a physiotherapeutic aid. The therapist may exercise a patient recovering from muscular or nervous disorders or damage for regular, short, periods of time each day and actually detect improvement in the patient's condition over a given period of time. In this embodiment the scale 41 can be made much larger than, for example, the embodiment of FIG. 1.

It is expected that many other forms and modifications of the scale of my invention will occur to those skilled in the art, and employed with the method disclosed above, which will be deemed to fall within the spirit of the invention, and scope of my claims.

I claim:

1. A method of measuring and producing a marked record of the reaction time of a person, comprising:
   a. compressing against a vertical surface a markable instrument of predetermined length which is designated between its upper and lower ends with a markable area representing the distance travelled by said instrument in free fall relative to time, said instrument being compressed by a first person against said vertical surface at a point adjacent to its upper end;
   b. positioning in front of said instrument a second person whose reaction time is to be measured and recorded, said second person aiming the point of a pencil a predetermined distance from a point adjacent to the lower end of said instrument; and
   c. releasing said instrument to fall freely down said vertical surface, said second person subsequently impinging and recompressing said instrument against said vertical surface with said pencil, in response to movement of said instrument down said surface, to place a pencil mark in said markable area between the upper and lower ends of said instrument to thereby produce thereon a record of his reaction time.

2. The method of claim 1 wherein said instrument is in the form of a thin, flat, semirigid, elongated, rectangular card of markable material.

3. The method of claim 1 wherein said instrument is in the form of a thin, flat, semirigid, elongated, rectangular card of markable material, and wherein said instrument is divided between its upper and lower ends into several areas correlating the distance travelled by said instrument in free fall relative to fractions of one second of time.

4. The method of claim 1 wherein said instrument is in the form of a thin, flat, semirigid, elongated, rectangular card of markable material, and wherein said instrument is divided between its upper and lower ends into areas correlating the distance travelled by said instrument in free fall relative to fractions of one second of time, and the same distance travelled by an automobile at 40, 60, and 80 miles per hour.